United States Patent
Ardha et al.

(10) Patent No.: US 12,449,139 B2
(45) Date of Patent: Oct. 21, 2025

(54) COMBINED SPACE AND WATER HEATING SYSTEMS

(71) Applicant: Rheem Manufacturing Company, Atlanta, GA (US)

(72) Inventors: Vishwanath Ardha, Montgomery, AL (US); Atilhan Manay, Roswell, GA (US); Robert L. Long, Fort Smith, AR (US); Harshad Inamdar, Fort Smith, AR (US); Timothy Shellenberger, Tyrone, GA (US)

(73) Assignee: Rheem Manufacturing Company, Atlanta, GA (US)

( * ) Notice: Subject to any disclaimer, the term of this patent is extended or adjusted under 35 U.S.C. 154(b) by 1167 days.

(21) Appl. No.: 17/086,863

(22) Filed: Nov. 2, 2020

(65) Prior Publication Data

US 2022/0136712 A1 May 5, 2022

(51) Int. Cl.
*F24D 19/10* (2006.01)
*F24D 3/08* (2006.01)
(Continued)

(52) U.S. Cl.
CPC ......... *F24D 19/1072* (2013.01); *F24D 3/082* (2013.01); *F24D 3/1066* (2013.01);
(Continued)

(58) Field of Classification Search
None
See application file for complete search history.

(56) References Cited

U.S. PATENT DOCUMENTS

| 1,874,803 A | 8/1932 | Reed |
| 2,375,157 A | 5/1945 | Wilkes et al. |

(Continued)

FOREIGN PATENT DOCUMENTS

| CN | 1568417 A | 1/2005 |
| CN | 1609518 A | 4/2005 |

(Continued)

OTHER PUBLICATIONS https://www.merriam-webster.com/dictionary/adjacent (retrieved Mar. 19, 2024) (Year: 2024).*

(Continued)

*Primary Examiner* — Edelmira Bosques
*Assistant Examiner* — Deepak A Deean
(74) *Attorney, Agent, or Firm* — Eversheds Sutherland (US) LLP

(57) ABSTRACT

A combination domestic hot water and space heating system is disclosed. The system includes two refrigerant circuits, one dedicated to heating potable water in a water storage tank and one dedicated to heating a condenser used to heat a space within a building. A controller sends output signals to valves to vary refrigerant flow into the first refrigerant circuit and/or the second refrigerant circuit. The variation in refrigerant flow can be provided by a single multi-directional valve, one or more valves placed at a first end of each refrigerant circuit, and/or one or more electronic expansion valves placed at the end of each refrigerant circuit. Portions of the system can be placed into a single housing, thereby reducing installation costs and labor.

20 Claims, 9 Drawing Sheets

(51) Int. Cl.
　　　*F24D 3/10*　　　(2006.01)
　　　*F24D 15/04*　　(2006.01)
　　　*F24D 17/02*　　(2006.01)

(52) U.S. Cl.
　　　CPC ............. *F24D 15/04* (2013.01); *F24D 17/02*
　　　　　　　　　　　(2013.01); *F24D 19/1024* (2013.01)

(56) References Cited

U.S. PATENT DOCUMENTS

| | | | |
|---|---|---|---|
| 3,308,877 A | 3/1967 | Gerteis | |
| 4,012,920 A | 3/1977 | Kirschbaum | |
| 4,019,338 A * | 4/1977 | Poteet | F25B 13/00 62/324.3 |
| 4,173,872 A * | 11/1979 | Amthor, Jr. | F24H 4/04 392/308 |
| 4,215,551 A | 8/1980 | Jones | |
| 4,227,382 A | 10/1980 | Coyne | |
| 4,238,933 A * | 12/1980 | Coombs | F24D 17/02 62/238.7 |
| 4,241,588 A | 12/1980 | Murphy et al. | |
| 4,281,519 A | 8/1981 | Spath et al. | |
| 4,293,323 A | 10/1981 | Cohen | |
| 4,299,098 A | 11/1981 | Derosier | |
| 4,350,024 A | 9/1982 | Moll | |
| 4,356,706 A | 11/1982 | Baumgarten | |
| 4,367,634 A | 1/1983 | Bolton | |
| 4,382,368 A | 5/1983 | Dittell | |
| 4,386,500 A | 6/1983 | Sigafoose | |
| 4,391,104 A | 7/1983 | Wendschlag | |
| 4,399,664 A * | 8/1983 | Derosier | F25B 13/00 62/238.7 |
| 4,448,347 A | 5/1984 | Dunstan | |
| 4,449,375 A | 5/1984 | Briccetti | |
| 4,452,050 A | 6/1984 | Pierce | |
| 4,514,990 A * | 5/1985 | Sulkowski | F24D 11/0214 62/238.7 |
| 4,528,822 A * | 7/1985 | Glamm | F24D 5/12 62/238.7 |
| 4,575,001 A | 3/1986 | Oskarsson et al. | |
| 4,599,870 A | 7/1986 | Hebert et al. | |
| 4,645,908 A | 2/1987 | Jones | |
| 4,646,537 A * | 3/1987 | Crawford | F25B 13/00 62/238.7 |
| 4,655,278 A * | 4/1987 | Seguin | F24F 3/001 62/412 |
| 4,693,089 A * | 9/1987 | Bourne | F24D 11/0214 62/238.7 |
| 4,798,240 A * | 1/1989 | Gerstmann | F24H 1/43 237/19 |
| 4,925,093 A * | 5/1990 | Moore, Jr. | F24H 1/206 237/19 |
| 4,943,003 A | 7/1990 | Shimizu et al. | |
| 5,003,788 A | 4/1991 | Fischer | |
| 5,036,676 A | 8/1991 | Dudley | |
| 5,050,394 A | 9/1991 | Dudley et al. | |
| 5,081,846 A | 1/1992 | Dudley et al. | |
| 5,086,624 A | 2/1992 | Matsuoka et al. | |
| 5,105,633 A | 4/1992 | Briggs | |
| 5,159,817 A | 11/1992 | Hojo et al. | |
| 5,220,807 A * | 6/1993 | Bourne | F24H 4/04 392/464 |
| 5,269,153 A | 12/1993 | Cawley | |
| 5,277,034 A | 1/1994 | Hojo et al. | |
| 5,465,588 A * | 11/1995 | McCahill | F24D 15/04 62/238.7 |
| 5,495,723 A | 3/1996 | MacDonald | |
| 5,511,723 A | 4/1996 | Toshio et al. | |
| 5,526,649 A | 6/1996 | Sada | |
| 5,575,159 A | 11/1996 | Dittell | |
| 5,628,200 A | 5/1997 | Pendergrass | |
| 5,755,111 A | 5/1998 | Toyama | |
| 5,906,104 A * | 5/1999 | Schwartz | F25B 6/02 62/238.7 |
| 6,032,868 A * | 3/2000 | DiMarco | F24H 6/00 237/19 |
| 6,357,245 B1 | 3/2002 | Weng et al. | |
| 7,040,108 B1 | 5/2006 | Flammang | |
| 7,155,922 B2 * | 1/2007 | Harmon | F25B 49/027 62/238.7 |
| 7,594,409 B2 | 9/2009 | Hayashi et al. | |
| 7,721,560 B2 | 5/2010 | Carpenter | |
| 8,037,931 B2 | 10/2011 | Penev et al. | |
| 8,356,481 B2 | 1/2013 | Penev | |
| 9,003,818 B2 | 4/2015 | Choi et al. | |
| 9,188,373 B2 | 11/2015 | Garrabrant | |
| 9,377,224 B2 | 6/2016 | Tamaki et al. | |
| 9,389,000 B2 | 7/2016 | Leete et al. | |
| 9,416,980 B2 | 8/2016 | Yan et al. | |
| 9,528,713 B2 | 12/2016 | Koge et al. | |
| 9,879,881 B2 | 1/2018 | Hawkins et al. | |
| 9,933,170 B2 | 4/2018 | Wong | |
| 10,871,307 B2 | 12/2020 | Hawkins et al. | |
| 10,871,314 B2 * | 12/2020 | Taras | F25B 41/20 |
| 10,895,387 B2 * | 1/2021 | Chaudhry | F24H 15/174 |
| 11,175,074 B1 * | 11/2021 | Bush | F25B 49/02 |
| 11,448,430 B2 * | 9/2022 | Taras | F25B 6/04 |
| 2002/0092311 A1 | 7/2002 | James | |
| 2004/0144528 A1 | 7/2004 | Kunimoto et al. | |
| 2004/0177628 A1 | 9/2004 | Kurata et al. | |
| 2005/0109490 A1 * | 5/2005 | Harmon | F25B 49/027 165/133 |
| 2005/0183432 A1 | 8/2005 | Cowans et al. | |
| 2006/0026976 A1 | 2/2006 | Carpenter | |
| 2006/0042285 A1 | 3/2006 | Heberle et al. | |
| 2006/0064995 A1 | 3/2006 | Rigal et al. | |
| 2006/0179874 A1 | 8/2006 | Barger | |
| 2006/0191495 A1 | 8/2006 | Sun | |
| 2006/0213210 A1 | 9/2006 | Tomlinson et al. | |
| 2007/0000274 A1 | 1/2007 | Li | |
| 2007/0068178 A1 | 3/2007 | Honma et al. | |
| 2008/0098760 A1 * | 5/2008 | Seefeldt | F25B 1/10 62/238.7 |
| 2008/0104986 A1 | 5/2008 | Gordon et al. | |
| 2008/0236185 A1 | 10/2008 | Choi et al. | |
| 2008/0245087 A1 | 10/2008 | Orcutt | |
| 2009/0026281 A1 | 1/2009 | McGreevy | |
| 2009/0049857 A1 | 2/2009 | Murakami et al. | |
| 2009/0120110 A1 | 5/2009 | Grabon et al. | |
| 2009/0248212 A1 | 10/2009 | Cowans et al. | |
| 2010/0000709 A1 | 1/2010 | Chang | |
| 2010/0050675 A1 | 3/2010 | Kameyama et al. | |
| 2010/0083950 A1 | 4/2010 | Bloxam | |
| 2010/0209084 A1 | 8/2010 | Nelson et al. | |
| 2010/0243202 A1 * | 9/2010 | Han | F24D 3/18 62/238.7 |
| 2011/0120168 A1 | 5/2011 | Choi et al. | |
| 2011/0214437 A1 | 9/2011 | Jeong et al. | |
| 2011/0259025 A1 | 10/2011 | Noh et al. | |
| 2012/0042678 A1 | 2/2012 | Park et al. | |
| 2012/0060521 A1 | 3/2012 | Roetker et al. | |
| 2012/0102991 A1 | 5/2012 | Lee et al. | |
| 2012/0180508 A1 | 7/2012 | Endoh et al. | |
| 2012/0312045 A1 | 12/2012 | Kim | |
| 2013/0104574 A1 * | 5/2013 | Dempsey | F24D 17/02 62/159 |
| 2013/0167559 A1 | 7/2013 | Kim et al. | |
| 2013/0180274 A1 * | 7/2013 | Tamaki | F25B 49/027 62/126 |
| 2013/0213072 A1 * | 8/2013 | Kawagoe | F25B 30/02 62/238.6 |
| 2013/0269380 A1 * | 10/2013 | Oya | F25B 13/00 62/190 |
| 2013/0312443 A1 | 11/2013 | Tamaki et al. | |
| 2014/0116072 A1 | 5/2014 | Kim et al. | |
| 2014/0174117 A1 | 6/2014 | Aoyagi et al. | |
| 2014/0230477 A1 | 8/2014 | Furui et al. | |
| 2014/0260358 A1 | 9/2014 | Leete et al. | |
| 2014/0260392 A1 | 9/2014 | Hawkins et al. | |
| 2015/0040841 A1 | 2/2015 | Leman et al. | |
| 2016/0040895 A1 | 2/2016 | Wong | |

(56) References Cited

U.S. PATENT DOCUMENTS

| | | | |
|---|---|---|---|
| 2016/0061508 A1* | 3/2016 | Lowrimore | F24H 15/39 62/160 |
| 2016/0131402 A1 | 5/2016 | Kim et al. | |
| 2017/0086334 A1 | 3/2017 | Riddle | |
| 2017/0234576 A1 | 8/2017 | Kawagoe et al. | |
| 2018/0010822 A1* | 1/2018 | Trant | F24H 6/00 |
| 2018/0010829 A1* | 1/2018 | Taras | F25B 13/00 |
| 2018/0051894 A1 | 2/2018 | Yoshida et al. | |
| 2018/0120011 A1 | 5/2018 | Goldman | |
| 2018/0172287 A1* | 6/2018 | Göransson | F24H 15/375 |
| 2019/0063792 A1 | 2/2019 | Kim et al. | |
| 2019/0195523 A1* | 6/2019 | Mowris | F24F 11/61 |
| 2019/0309989 A1 | 10/2019 | Chikami et al. | |
| 2019/0309995 A1 | 10/2019 | Chikami et al. | |
| 2020/0149785 A1 | 5/2020 | Kojima | |
| 2020/0278138 A1 | 9/2020 | Huang et al. | |
| 2021/0131709 A1* | 5/2021 | Taras | F25B 6/04 |
| 2022/0163241 A1 | 5/2022 | Kim et al. | |
| 2022/0390148 A1* | 12/2022 | Taras | F25B 13/00 |

FOREIGN PATENT DOCUMENTS

| | | |
|---|---|---|
| CN | 200972229 Y | 11/2007 |
| CN | 101614451 A | 12/2009 |
| DE | 10058273 A1 | 5/2002 |
| EP | 0138568 A2 | 4/1985 |
| EP | 0151493 A2 | 8/1985 |
| EP | 0240441 A2 | 10/1987 |
| EP | 2103884 A1 | 9/2009 |
| EP | 2360439 A1 | 8/2011 |
| EP | 2489972 A1 | 8/2012 |
| EP | 2538145 A2 | 12/2012 |
| GB | 2537453 A | 10/2016 |
| JP | H10288420 A | 10/1998 |
| JP | 2011094931 A | 5/2011 |
| JP | 5121908 B2 | 1/2013 |
| JP | 2017198414 A | 11/2017 |
| RU | 2566900 C2 | 10/2015 |
| RU | 2701027 C1 | 9/2019 |
| WO | 1990002300 A1 | 3/1990 |
| WO | 2003036178 A1 | 5/2003 |
| WO | 2006039580 A1 | 4/2006 |
| WO | 2006128263 A1 | 12/2006 |
| WO | 2006128264 A1 | 12/2006 |
| WO | 2007146050 A2 | 12/2007 |
| WO | 2010093516 A2 | 8/2010 |
| WO | 2011015731 A | 2/2011 |
| WO | 2012041225 A1 | 4/2012 |
| WO | 2012/164608 A1 | 12/2012 |
| WO | 2013061473 A1 | 5/2013 |
| WO | 2019178117 A1 | 9/2019 |

OTHER PUBLICATIONS https://www.merriam-webster.com/dictionary/attached (retrieved Mar. 19, 2024) (Year: 2024).*

International Search Report and Written Opinion for PCT Application No. PCT/US2021/057537 mailed Feb. 3, 2022.

Kang et al., "Investigation of Energy and Environmental Potentials of a Renewable Trigeneration System in a Residential Application," Energies 2016, 9(9), 760, pp. 1-17.

International Search Report and Written Opinion for PCT Application No. PCT/US2021/040781 mailed Oct. 14, 2021.

"Mitsubishi Electric VRF R2 Heat Recovery System," webpage https://www.youtube.com/watch?v=9HAzk2s7sYw, published on YouTube on Internet, Jan. 13, 2016.

"Mitsubishi Electric—City Multi R2 Series," webpage https://www.youtube.com/watch?v=-_2Xp5xDXYM, published on YouTube on Internet, Jan. 28, 2011.

"HVAC Multi-Split Variable Refrigerant Flow (VRF) Systems," webpage https://pdhonline.com/courses/m394/m394content.pdf, by A. Bhatia, 2020, 25 pps.

EPO, "Examination Report," Application No. 19177498.3, dated Nov. 17, 2022.

EPO, "Supplementary European Search Report" Application No. 21843395.1, dated Jul. 23, 2024, 10 pages.

"LG Hydro Kit," webpage https://lghvac.com/hydrokit/, retrieved from Internet on Oct. 25, 2023.

"Hot Water Solution (Hydro Kit)," webpage https://www.lg.com/global/business/hot-water-solution-hydro-kit/, retrieved from Internet on Oct. 25, 2023.

PCT, "International Search Report & Written Opinion" Application No. PCT/US2014/018699, dated Jun. 13, 2014.

PCT, "International Search Report & Written Opinion" Application No. PCT/US2014/026894, dated Jul. 15, 2014.

EPO, "Extended European Search Report" Application No. 14773958.5, dated Apr. 10, 2017.

CNIPO, "First Office Action" Application No. 201480024058.8, dated Jan. 17, 2017.

AUIPO, "Second Examination Report" Application No. 2014243719, dated Mar. 17, 2017.

AUIPO, "Pre-Examination Processing Notice" Application No. 2014243719, dated Feb. 15, 2016.

CAIPO, "Examiner's Requisition" Application No. 2906662, dated Jun. 28, 2017.

CAIPO, "Office Action" Application No. 2906662, dated Aug. 23, 2016.

Rheem, "Integrated Air & Water System" Form No. S11-945, dated Jan. 2012, 60 pages.

* cited by examiner

COMBINED SPACE AND WATER HEATING SYSTEMS

FIELD OF THE DISCLOSURE

Examples of the present disclosure relate generally to combined space and water heating systems and, more specifically, to combined space and water heating systems with multiple refrigerant circuits for heating potable water and heating non-potable water for space heating.

BACKGROUND

Amid the global warming concerns within the past few decades, triggered by elevated $CO_2$ emissions, the water and space heating industry has been challenged to reduce greenhouse gas emissions. Indeed, the industry has been required, either by consumer demand or governmental regulation, to create appliances with reduced $CO_2$ footprint and to eliminate excessive use of fossil fuels. To this end, manufacturers have developed new vapor compression-based systems that can simultaneously heat potable water for customer use and heat non-potable water for hydronic heating of spaces within buildings. Heating the non-potable water can obviate the need to provide a forced-air furnace that relies on fossil fuel burners or electric heating elements to heat the passing air, or fossil fuel-fired boilers that heat water to provide hydronic heating through radiators.

Current combination solutions in the industry, however, are typically split systems and are expensive to install due to system components such as evaporator(s), condenser(s), and buffer tanks being located at different locations in the building. For example, it is common for a single vapor compression-based water/space heating system to include the water heating condenser at one location in the house, the compressor and evaporator outside the house, and a pump with non-potable water storage inside the house at a different location. This setup may need multiple technicians from different trades to plumb the water pipes, install refrigerant tubing, and install electrical wiring to complete the system, which can be expensive and take a considerable amount of time.

Recent designs have attempted to eliminate the drawbacks of split systems (e.g., as described above) by providing a single package, integrated vapor, compression-based water heating system that heats the potable water first, and the hot potable water then heats the non-potable water for hydronic space heating. In other words, prior systems sought to make a single (non-split) system by using indirect heating—hot water in one circuit heats water in another circuit. This indirect heating, however, is not as efficient as direct heating by condenser tubes, heat exchangers, and the like. What is needed, therefore, is a system that combine water and space heating capabilities while also preserving high efficiency. Preferably, the system can be contained into a single assembly and/or can heat both potable and non-potable water directly.

BRIEF SUMMARY

These and other problems can be addressed by the technologies described herein. Examples of the present disclosure relate generally to combined space and water heating systems and, more specifically, to combined space and water heating systems with multiple refrigerant circuits for heating potable water and heating non-potable water for space heating.

The present disclosure provides a heating system. The heating system can include an evaporator having an evaporator inlet and an evaporator outlet. The heating system can include a compressor having a compressor inlet in fluid communication with the evaporator outlet and a compressor outlet. The heating system can include a water storage tank to store potable water. The heating system can include a first condenser that is near and in contact with the water storage tank to heat the potable water. The heating system can include a first refrigerant circuit in fluid communication with the compressor outlet at a first end of the first refrigerant circuit, and in fluid communication with the evaporator inlet at a second end of the first refrigerant circuit. The first refrigerant circuit can provide heat to heat the first condenser and thus the potable water. The heating system can include a second condenser for heating a fluid to provide a space heating effect. The heating system can include a second refrigerant circuit in fluid communication with the compressor outlet at a first end of the second refrigerant circuit and in fluid communication with the evaporator inlet at a second end of the second refrigerant circuit. The second refrigerant circuit can provide heat to the second condenser.

The compressor outlet can include a circuit split, a first end of the circuit split in fluid communication with the first end of the first refrigerant circuit, and a second end of the circuit split in fluid communication with the first end of the second refrigerant circuit. The circuit split can include a multi-directional valve configured to independently vary refrigerant flow to the first refrigerant circuit and the second refrigerant circuit. The heating system can include an expansion valve positioned near the evaporator inlet. The second end of the first refrigerant circuit and the second end of the second refrigerant circuit merge into a single conduit in fluid communication with the expansion valve.

The compressor outlet can include a circuit split, a first end of the circuit split in fluid communication with the first end of the first refrigerant circuit, and a second end of the circuit split in fluid communication with the first end of the second refrigerant circuit. The heating system can include a first valve disposed along the first refrigerant circuit between the circuit split and the water storage tank. The first valve can vary refrigerant flow into the first refrigerant circuit. The heating system can include a second valve disposed along the second refrigerant circuit between the circuit split and the second condenser. The second valve can vary refrigerant flow into the second refrigerant circuit. The heating system can include an expansion valve positioned near the evaporator inlet. The second end of the first refrigerant circuit and the second end of the second refrigerant circuit merge into a single conduit in fluid communication with the expansion valve.

The heating system can include a first electronic expansion valve placed along the first refrigerant circuit between the first condenser and the evaporator inlet. The first electronic expansion valve can vary refrigerant flow out of the first refrigerant circuit and into the evaporator. The heating system can include a second electronic expansion valve placed along the second refrigerant circuit between the second condenser and the evaporator inlet. The second electronic expansion valve can vary refrigerant flow out of the second refrigerant circuit and into the evaporator.

The heating system can include a fan that blows air across the second condenser. The second condenser can, in these examples, heat the air flowing across the second condenser.

The heating system can include a radiant heating tube and a circulation pump. The second condenser can heat the radiant heating tube. The second condenser can, in this embodiment, be a brazed plate heat exchanger.

The heating system can include a first enclosure containing the water storage tank and at least a portion of the first refrigerant circuit. The heating system can include a second enclosure containing the second condenser and at least a portion of the second refrigerant circuit. The second enclosure can be attached to the first enclosure to generate a compact and integrated assembly.

The present disclosure further provides a heating system. The heating system can include a water storage tank. The heating system can include a first temperature sensor configured to detect a water temperature of water within the water storage tank. The heating system can include a first refrigerant circuit configured to heat the storage water tank. The heating system can include a second condenser. The heating system can include a second temperature sensor configured to detect air temperature within a space. The heating system can include a second refrigerant circuit configured to provide heat to the second condenser. The heating system can include a controller having a processor and memory storing instructions that, when executed by the processor, cause the controller to operate the processes to provide heat to the water storage tank, the second condenser, or both. The controller can receive a first input signal from the first temperature sensor. The controller can transmit a first output signal to adjust refrigerant flow into the first refrigerant circuit based on the first input signal. The controller can receive a second input signal from the second temperature sensor. The controller can transmit a second output signal to adjust refrigerant flow into the second refrigerant circuit based on the second input signal.

The first input signal can be indicative of the water temperature being below a first predetermined threshold. The first output signal can include instructions to increase the refrigerant flow into the first refrigerant circuit. The second input signal can be indicative of the air temperature being below a second predetermined threshold. The second output signal can include instructions to increase the refrigerant flow into the second refrigerant circuit.

The heating system can include valves similar to those described above. For example, the heating system can include a multi-directional valve as described above. The first output signal and the second output signal can include instructions to adjust the multi-directional valve. The heating system can include two valves for independently adjusting refrigerant flow into the first or second refrigerant circuits, as described above. The first output signal can include instructions to adjust the first valve responsive to the first input signal; the second output signal can include instructions to adjust the second valve responsive to the second input signal. The system can include a first electronic expansion valve disposed along the first refrigerant circuit and configured to vary refrigerant flow out of the first refrigerant circuit and into an evaporator; and a second electronic expansion valve disposed along the second refrigerant circuit and configured to vary refrigerant flow out of the second refrigerant circuit and into the evaporator. The first output signal can include instructions to adjust the first electronic expansion valve responsive to the first input signal, and the second output signal can include instructions to adjust the second electronic expansion valve responsive to the second input signal.

The heating system can also include a fan that can blow air across the second condenser. The second condenser can heat the air flowing across the second condenser.

The heating system can include a radiant heating tube and a circulation pump. The second condenser can heat the radiant heating tube. The second condenser can be a brazed plate heat exchanger.

The heating system can include a first enclosure containing the water storage tank and at least a portion of the first refrigerant circuit. The heating system can include a second enclosure containing the second condenser and at least a portion of the second refrigerant circuit. The second enclosure can be attached to the first enclosure to generate a compact and integrated assembly.

The present disclosure also describes the controller in greater detail and provides methods of controlling the systems described herein using the controller. These and other aspects of the present disclosure are described in the Detailed Description below and the accompanying figures. Other aspects and features of the present disclosure will become apparent to those of ordinary skill in the art upon reviewing the following description of specific examples of the present disclosure in concert with the figures. While features of the present disclosure may be discussed relative to certain examples and figures, all examples of the present disclosure can include one or more of the features discussed herein. Further, while one or more examples may be discussed as having certain advantageous features, one or more of such features may also be used with the various other examples of the disclosure discussed herein. In similar fashion, while examples may be discussed below as devices, systems, or methods, it is to be understood that such examples can be implemented in various devices, systems, and methods of the present disclosure.

BRIEF DESCRIPTION OF THE DRAWINGS

The accompanying drawings, which are incorporated in and constitute a part of this specification, illustrate multiple examples of the presently disclosed subject matter and serve to explain the principles of the presently disclosed subject matter. The drawings are not intended to limit the scope of the presently disclosed subject matter in any manner. In the drawings.

DETAILED DESCRIPTION

As the water and space heating industry strives to create more efficient, greener, more cost-effective heating systems, manufacturers have diverged from the prior status quo of having an interior potable water heating system and a separate forced-air furnace with a fossil fuel burner or electric heating element. Recently, the use of vapor compression-based hydronic heating systems has increased in popularity. Hydronic heating includes moving heated water to a desired destination for space heating. For example, heated, non-potable water can be supplied via tubing to floors, walls, radiators, and/or heat exchangers to heat the space. These hydronic systems are typically separated from the potable water, which is typically stored in a conventional water storage tank heating system. In other words, to heat both potable and non-potable water, the systems include split heat pump systems. Separating the potable water heating from the non-potable water heating provides a number of drawbacks and inefficiencies.

For one, dividing the space and water heating systems into separate assemblies can increase the installation costs by requiring plumbers, electricians, and other tradespersons to plumb water piping, install refrigerant tubing, and install electrical wiring at multiple locations in the home or building. Certain attempts by prior designs to combine the two systems into a single assembly heat the non-potable water used for space heating with the heated potable water stored in the water heater tank. These systems, however, suffer the inefficiency of heating water with water, i.e., indirect heating.

The systems described herein, in contrast, can use direct heat transfer paths (i.e., refrigerant to water) on both space heating ("SH") and domestic hot water ("DHW") refrigerant circuits to improve heat transfer effectiveness. The entire system can be integrated in a single assembly containing one or more enclosures (e.g., "cabinets") to reduce the installation time, for example by minimizing piping circuits that need to be erected and connections that need to be made in the field during installation. Various systems and methods are disclosed for combined space and water heating systems with multiple refrigerant circuits, and example systems will now be described with reference to the accompanying figures.

Figure 1:
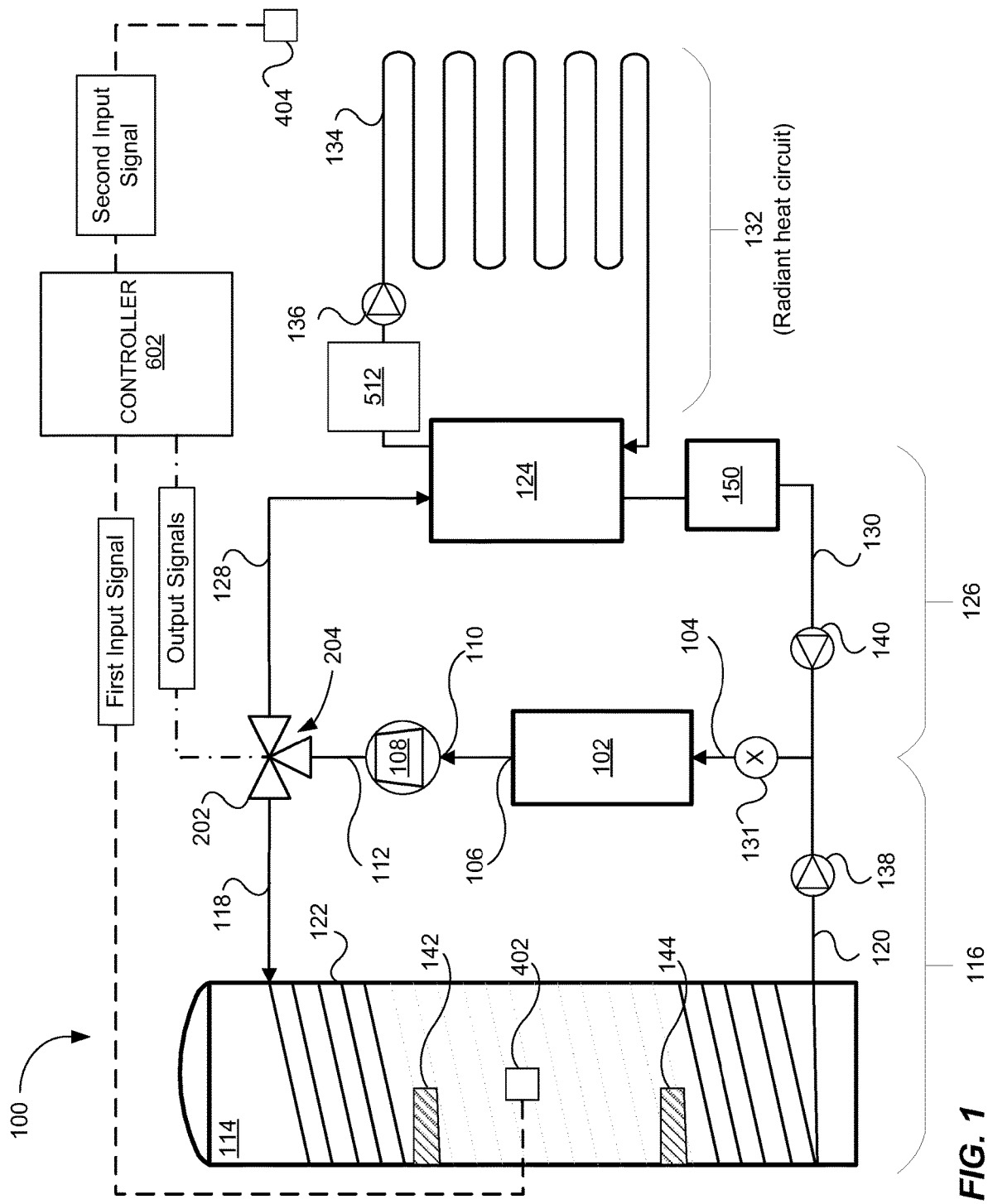
FIG. 1 is a schematic of an example heating system having a multi-directional valve to split refrigerant between a first refrigerant circuit and a second refrigerant circuit, according to the present disclosure.
Figure 2:
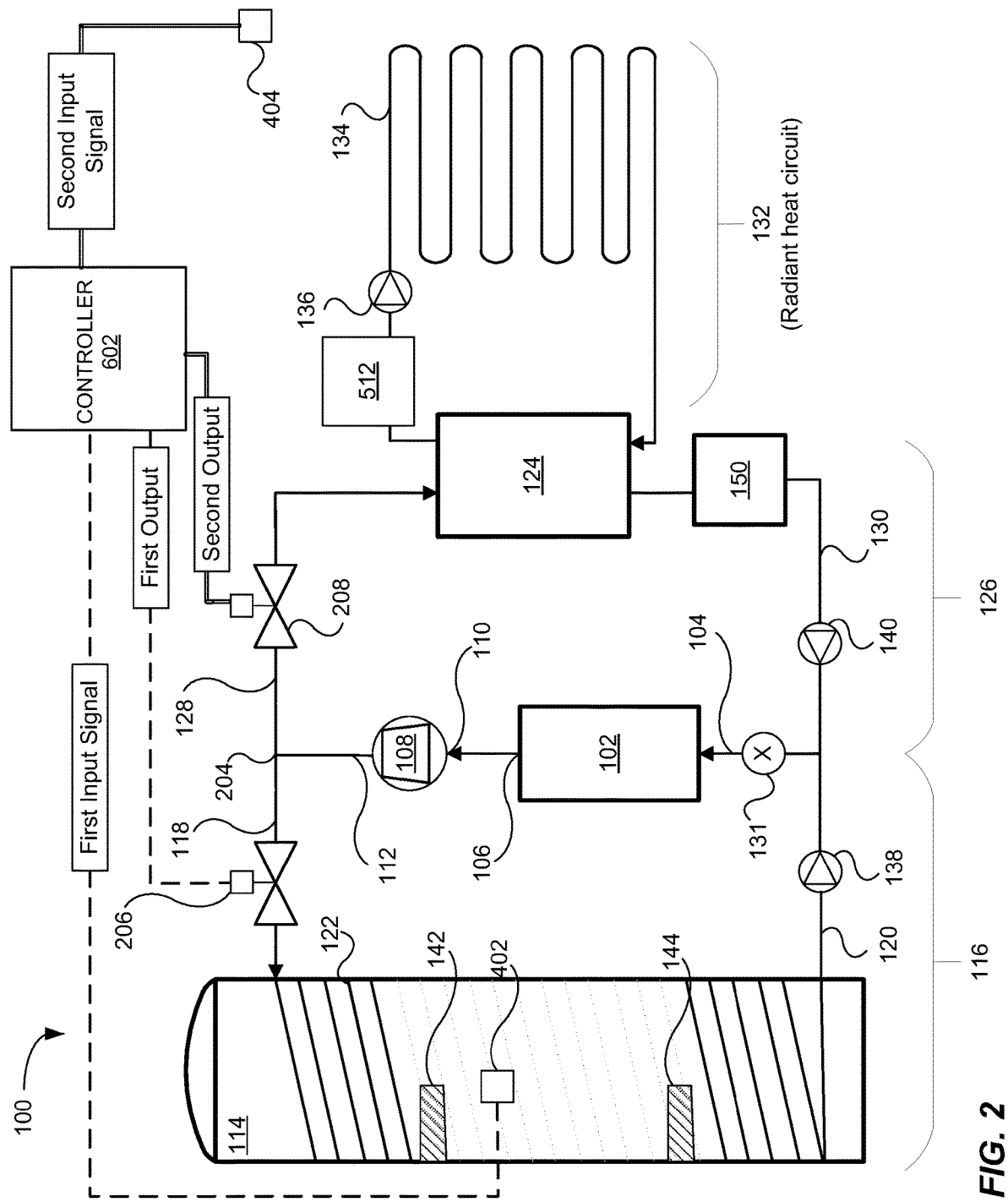
FIG. 2 is a schematic of an example heating system having a first valve placed along the first refrigerant circuit and a second valve placed along a second refrigerant circuit, according to the present disclosure.
Figure 3:
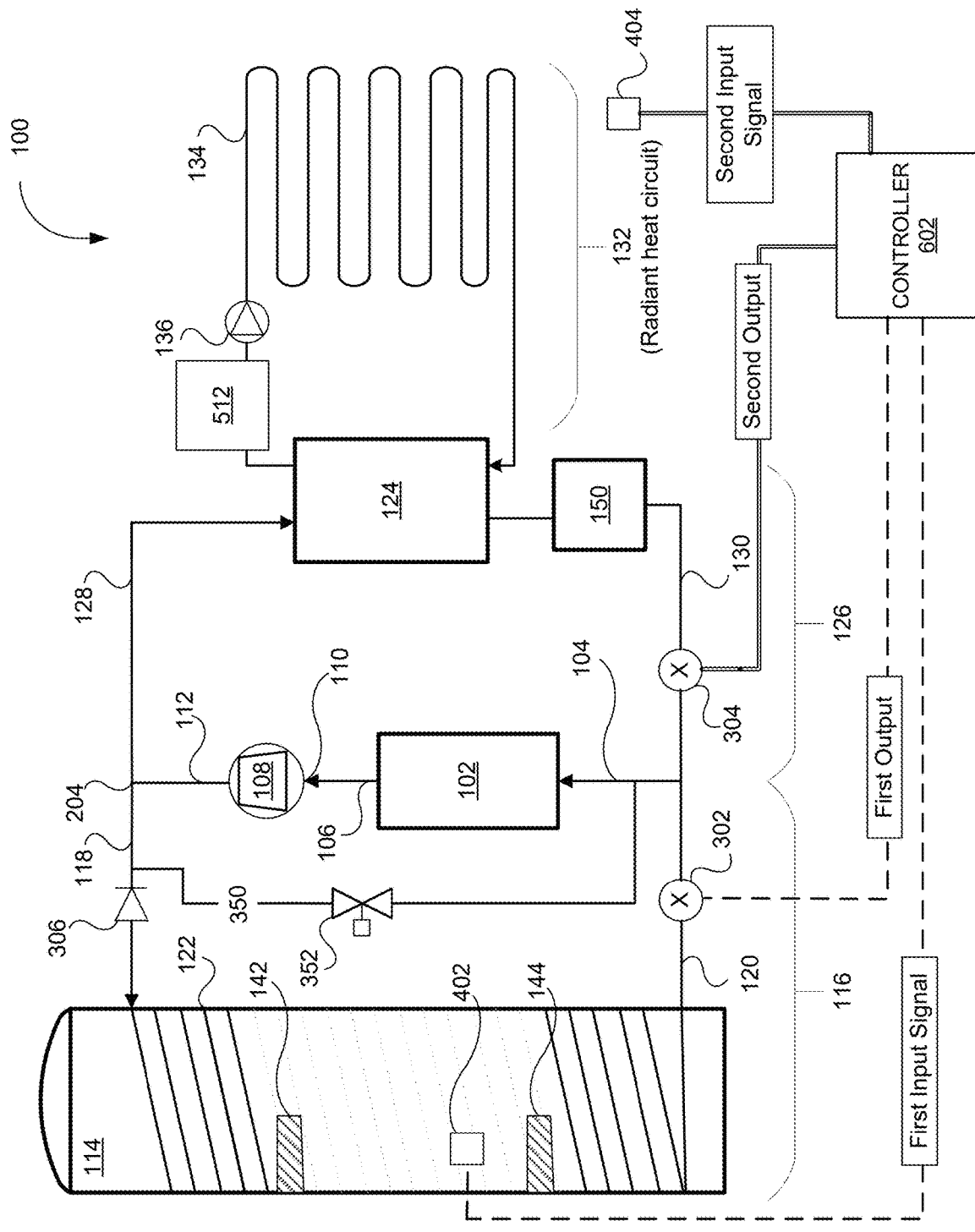
FIG. 3 is a schematic of an example heating system wherein each refrigerant circuit includes a dedicated electronic expansion valve placed at the end of the circuit, according to the present disclosure.
Figure 4:
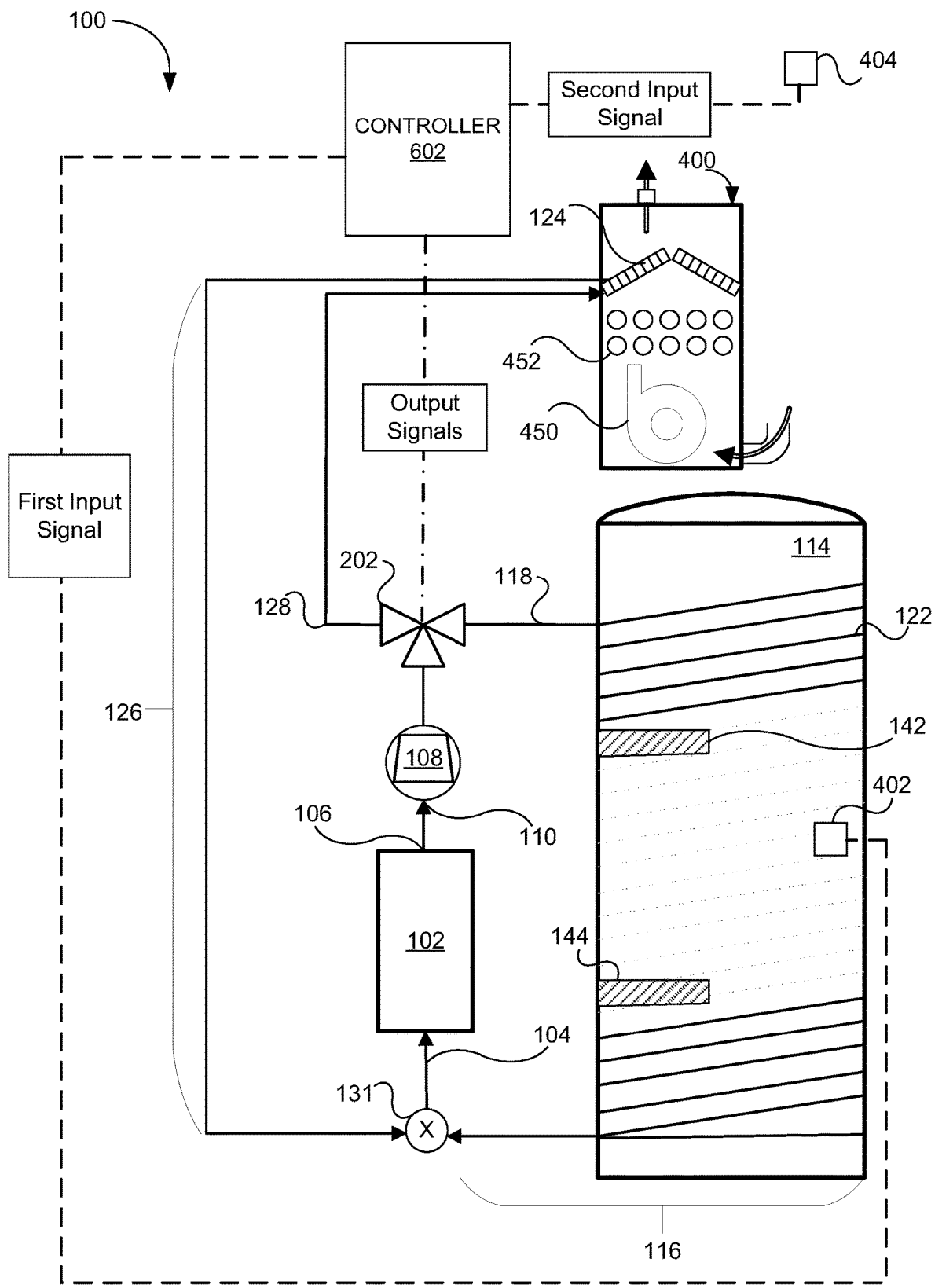
FIG. 4 is a schematic of an example heating system wherein the second refrigerant circuit heats an air furnace, according to the present disclosure.

FIG. 1 is a schematic of an example heating system 100 having a multi-directional valve 202 to split refrigerant between a first refrigerant circuit 116 and a second refrigerant circuit 126. The heating system 100 can include an evaporator 102 having an evaporator inlet 104 and an evaporator outlet 106. Once the refrigerant is heated and vaporized in the evaporator 102, the refrigerant can travel from the evaporator inlet 104 to a compressor 108 via a compressor inlet 110. High pressure, high temperature vapor can then exit the compressor 108 at a compressor outlet 112 and travel to a split, where the refrigerant conduits can split to provide refrigerant to one or more of a first refrigerant circuit 116 and a second refrigerant circuit 126. As will be described below with reference to other heating system 100 designs (e.g., as shown in FIGS. 2-4), this split in the refrigerant path can occur at a circuit split 204 between the first refrigerant circuit 116 and the second refrigerant circuit 126. In FIG. 1, the circuit split 204 includes a multi-directional valve 202 that can provide refrigerant to the first refrigerant circuit 116, the second refrigerant circuit 126, or both circuits simultaneously.

The first refrigerant circuit 116 can route the high pressure, high temperature vaporized refrigerant to heat a water storage tank 114. The first refrigerant circuit 116 can be in fluid communication with the compressor outlet 112 at a first end 118 and the evaporator inlet 104 at a second end 120. The first refrigerant circuit 116 can lead to a first condenser 122 wrapped around the water storage tank 114 that directly heats the water tank and, thus, the potable water stored therein. The refrigerant can exit the first refrigerant circuit 116 at the second end 120 of the circuit and continue to the evaporator 102. An expansion valve 131 can be placed in the path of refrigerant flow leading into the evaporator inlet 104. The second end 120 of the first refrigerant circuit 116 and the second end 130 of the second refrigerant circuit 126 can merge into a single conduit in fluid communication with the expansion valve 131 prior to flowing into the evaporator 102.

The second refrigerant circuit 126 can route the high pressure, high temperature vaporized refrigerant to heat a second condenser 124 that can be used to heat non-potable water for space heating. The second refrigerant circuit 126 can be in fluid communication with the compressor outlet 112 at a first end 128 and the evaporator inlet 104 at a second end 130. The second condenser 124 can provide heat to non-potable water in a radiant heating circuit 132. The radiant heating circuit 132 can include one or more radiant heating tubes 134 and a circulation pump 136 that circulates heated non-potable water through the radiant heating tube(s) 134. The radiant heating circuit 132 can extend into a room to heat a particular space. The one or more radiant heating tubes 134 can be placed in floors or walls to heat a space, into a radiator to heat the space, or the like.

The second condenser 124 can include any number of designs that can provide the space-heating attributes of the present heating system. The second condenser 124 can be one or more condenser tubes that provide heat to the radiant heat circuit 132. For example, the second refrigerant circuit 126 can coil around the radiant heat circuit 132 to provide heat to the circuit. The second condenser 124 can include a brazed plate heat exchanger. Brazed plate heat exchangers can provide high efficiency heat transfer within a small space. Since one aspect of the present disclosure is to provide an integrated heating system 100 that can supply heat to both refrigerant circuits (i.e., the first circuit for water heating and the second circuit for space heating) within a single integrated assembly, the small-form design of brazed plate heat exchangers can provide a compact option to achieve that goal. Other types of condenser geometries are also compatible with the present systems.

Referring again to the multi-directional valve 202 at the circuit split of the system, the multi-directional valve 202 can adjust the amount of refrigerant flow into the first refrigerant circuit 116 and/or the second refrigerant circuit 126. The multi-directional valve 202 can be a three-way valve, as shown in FIG. 1, that modulates refrigerant flow into the individual circuits based on demand. When hot water is in demand, the multi-directional valve 202 can be energized, and one port and/or leg of the valve can open to activate the first refrigerant circuit 116. The refrigerant can then flow into the first condenser 122 wrapped around water storage tank 114 to heat the water until it reaches a predetermined threshold. When space heating is in demand, the multi-directional valve 202 can be energized, and one port and/or leg of the valve can open to activate the second refrigerant circuit 126. The refrigerant can then flow into the second condenser 124 to provide space heating (e.g., via the radiant heat circuit 132 in FIG. 1). It is also possible with the multi-directional valve 202 to completely open such that refrigerant flow equally into both circuits. Also, the multi-directional valve 202 can be opened such that a greater portion of refrigerant flows into one circuit than the other; for example more refrigerant flows into the first refrigerant circuit 116 when hot potable water is in high demand, but demand for space heating is low.

The heating system 100 can include a first check valve 138 on the first refrigerant circuit 116 and/or a second check valve 140 on the second refrigerant circuit 126 to prevent backflow in the system. The heating system 100 can also include one or more backup heating elements (e.g., first heating element 142 and second heating element 144) within the water storage tank 114 so as to provide additional heating to the water in cases of high demand. The first heating element 142 and second heating element 144 can be electrical heating elements. The second refrigerant circuit 126 can include an accumulator 150 to prevent wet vapor entering the compressor 108 and/or filter drier to remove moisture and impurities from the refrigerant circuit. An accumulator 150 and/or filter drier can also be placed along the circuit of the first refrigerant circuit 116.

The system can include a controller 602 that can provide the logic that operates the multi-directional valve 202 to vary the refrigerant flow into the first refrigerant circuit 116 and/or second refrigerant circuit 126. The controller 602 can communicate via one or more temperature sensors over a wired or wireless connection such that the controller 602 can act on hot water demand or space heating demand. The heating system 100 can include a first temperature sensor 402 located proximate the water storage tank 114 that can read the temperature of the water within the tank. The first temperature sensor 402 can send an input signal to the controller 602 including data indicative of the temperature of the water. If the water temperature is below a predetermined threshold, the controller 602 can send an output signal to the multi-directional valve 202 to increase the refrigerant flow into the first refrigerant circuit 116. Additionally or alternatively, the heating system 100 can include a second temperature sensor 404 located proximate the room or other space being heating by the second circuit of the heating system 100. The second temperature sensor 404 can read the temperature of the space and can send an input signal to the controller 602 including data indicative of the temperature of the space. If the air temperature in the space is below a predetermined threshold, the controller 602 can send an output signal to the multi-directional valve 202 to increase the refrigerant flow into the second refrigerant circuit 126. The first temperature sensor 402 and/or second temperature sensor 404 can be thermometers, thermocouples, thermistors, and the like.

The heating system 100 can also include a secondary hydronic heating element 512 positioned along the radiant heat circuit 132. The secondary hydronic heating element 512 can be an electric or gas element that serves as a backup in the case space heating is in high demand or, alternatively, if space heating is in demand at the same time hot potable water is in demand. The secondary hydronic heating element 512 can serve to share the load of the second condenser 124 so as to heat the non-potable water in the radiant heat circuit 132.

FIG. 2 is a schematic of an example heating system 100 having a first valve 206 placed along the first refrigerant circuit 116 and a second valve 208 placed along a second refrigerant circuit 126. The example heating system 100 shown in FIG. 2 is substantially similar to the example shown in FIG. 1. In FIG. 2, instead of having a single multi-directional valve 202 placed at the circuit split 204, the heating system 100 includes two valves 206, 208 placed after the split. The first valve 206 can be placed at the first end 118 of the first refrigerant circuit 116 between the circuit split 204 and the water storage tank 114. The second valve 208 can be placed at the first end 128 of the second refrigerant circuit 126 between the circuit split 204 and the second condenser 124. The first valve 206 and the second valve 208 can be used to independently vary the refrigerant flow into the first condenser 122 and the second condenser 124, respectively. The first valve 206 and/or second valve 208 can be any number of valves that enable adjustability of the refrigerant flow therethrough, including but not limited to solenoid valves or other electronically and/or mechanically operated valves. As described above for FIG. 1, an expansion valve 131 can be placed in the path of refrigerant flow leading into the evaporator inlet 104. The second end 120 of the first refrigerant circuit 116 and the second end 130 of the second refrigerant circuit 126 can merge into a single conduit in fluid communication with the expansion valve 131 prior to flowing into the evaporator 102.

When hot water is in demand, the controller 602 can activate the first valve 206 so that the valve opens to enable refrigerant flow into the first refrigerant circuit 116. The controller 602 can also close or partially close the second valve 208 so as to ensure sufficient heating is provided to the first condenser 122. Alternatively or in addition, when space heating is in demand, the controller 602 can activate the second valve 208 so that the valve opens to enable refrigerant flow into the second refrigerant circuit 126. The controller 602 can also close or partially close the first valve 206 so as to ensure sufficient heating is provided to the second condenser 124. As described above, it is also possible for both valves 206, 208 to be opened or partially opened so as to provide both space and water heating simultaneously.

As described above, a controller 602 can provide the logic that operates the first valve 206 and/or the second valve 208 so as to vary the refrigerant flow into each circuit. The heating system 100 shown in FIG. 2 can also include a first temperature sensor 402 located proximate the water storage tank 114 and a second temperature sensor 404 located within the space to be heated. The first temperature sensor 402 can send an input signal to the controller 602 including data indicative of the temperature of the water. If the water temperature is below a predetermined threshold, the controller 602 can send an output signal to the first valve 206 to increase the refrigerant flow into the first refrigerant circuit 116. A separate signal can be sent to the second valve 208, for example, to close and/or partially close the second valve 208 so as to direct all or a majority of the refrigerant to the first condenser 122. The second temperature sensor 404 can send an input signal to the controller 602 including data indicative of the temperature of the air in the space to be heated. If the air temperature is below a predetermined threshold, the controller 602 can send an output signal to the second valve 208 to increase the refrigerant flow into the second refrigerant circuit 126. A separate signal can be sent to the first valve 206, for example, to close and/or partially close the first valve 206 so as to direct all or a majority of the refrigerant to the second condenser 124.

FIG. 3 is a schematic of an example heating system 100 wherein each refrigerant circuit includes a dedicated electronic expansion valve placed at the end of each circuit. The example heating system 100 shown in FIG. 3 is substantially similar to the examples shown in FIGS. 1 and 2. In FIG. 3, instead of having one or more valves placed at the first ends of the circuits (e.g., first end 118 and first end 128), the heating system 100 can include electronic expansion valves (EEV) at the second ends of the circuits (e.g., second end 120 and second end 130). For example, the first refrigerant circuit 116 can include a first EEV 302 placed along the first refrigerant circuit 116 between the water storage tank 114 (i.e., first condenser 122) and the evaporator inlet 104. The second refrigerant circuit 126 can include a second EEV 304 placed along the second refrigerant circuit 126 between the second condenser 124 and the evaporator inlet 104.

During full hydronic water heating (e.g., via the second refrigerant circuit 126), the first EEV 302 can be completely closed, and the refrigerant can flow though the second condenser 124, through the second EEV 304, and to the evaporator 102. During full potable water heating (e.g., via the first refrigerant circuit 116), the second EEV 304 can be completely closed, and the refrigerant can flow though the first condenser 122, through the first EEV 302, and to the evaporator 102. It is noted, however, that use of an EEV, as opposed to a mechanical expansion valve, enables the heating system 100 to modulate between full water heating and full hydronic heating modes. When the heating system 100 is modulating between both modes, the controller 602 can output signals such that one of the EEVs is open to a fixed position while the other EEV is used to control the superheat at the outlet of the evaporator 102. For example, when only a small amount of hydronic water heating is required (i.e., via second refrigerant circuit 126), the controller 602 can output a signal to open the second EEV 304 slightly so that a small quantity of refrigerant is metered through the second refrigerant circuit 126. Here, the first EEV 302 can enable a full range of operation necessary to control the superheat at the evaporator outlet 106. When a large amount of hydronic water heating is required (e.g., more than 60% of the entire heating capacity of the system) the operation of the EEVs can be reversed. In this case, the first EEV 302 can be opened slightly by the controller 602, while the second EEV 304 enables a full range of operation necessary to control the superheat at the evaporator outlet 106.

Referring again to the controller 602 in FIG. 3, the controller 602 can provide the logic that operates the first EEV 302 and/or the second EEV 304 so as to vary the refrigerant flow out of each circuit. The heating system 100 shown in FIG. 3 can also include a first temperature sensor 402 located proximate the water storage tank 114 and a second temperature sensor 404 located within the space to be heated. The first temperature sensor 402 can send an input signal to the controller 602 including data indicative of the temperature of the water. If the water temperature is below a predetermined threshold, the controller 602 can send an output signal to the first EEV 302 to increase the refrigerant flow out of the first refrigerant circuit 116. A separate signal can be sent to the second EEV 304, as described above, to either close or, alternatively, open only slightly so that a small quantity of refrigerant is metered through the second refrigerant circuit 126. The second temperature sensor 404 can send an input signal to the controller 602 including data indicative of the temperature of the air in the space. If the air temperature is below a predetermined threshold, the controller 602 can send an output signal to the second EEV 304 to increase the refrigerant flow out of the second refrigerant circuit 126. A separate signal can be sent to the first EEV 302, as described above, to either close or, alternatively, open only slightly so that a small quantity of refrigerant is metered through the first refrigerant circuit 116.

The heating system 100 can also include a hot refrigerant bypass loop 350 between the compressor outlet 112 and the evaporator inlet 104. In FIG. 3, the bypass loop 350 is placed after the circuit split 204, but the bypass loop 350 can also originate before the circuit split 204. The hot refrigerant bypass loop 350 can provide defrost capabilities when the evaporator's 102 coil is exposed to outside air conditions that may cause ice buildup on the evaporator 102 coil. A temperature sensor can be placed into an airstream inlet of the evaporator 102 to detect exterior temperatures, and the heating system 100 can respond to the conditions sensed by the temperature sensor. Alternatively or in addition, a temperature sensor can be located at one or more different locations. For example, a temperature sensor can be located on or near the evaporator 102 and can be configured to measure the surface temperature of the evaporator 102. If the temperature detected by the external temperature sensor is less than a predetermined value, the heating system 100 (e.g., controller 602 of the system) can output a signal to a hot gas bypass solenoid valve 352 to open and provide heated refrigerant to the evaporator 102. For example, if the temperature at the evaporator 102 is below 35° F., the controller 602 can periodically (e.g., every hour, ever two hours, etc.) send a signal to the hot gas bypass solenoid valve 352 to open, until the suction line temperature leaving the evaporator reaches a desired temperature (e.g., greater than 60° F., for example 65° F.). The hot gas bypass solenoid valve 352 can have an internal orifice to regulate the flow of bypass refrigerant; alternatively or additionally, a separate restrictor can be applied for the same purpose.

FIG. 4 is a schematic of an example heating system 100 wherein the second refrigerant circuit 126 heats a forced-air furnace 400. Although the examples described above include a second circuit that is used for hydronic heating, the present heating systems 100 are not so limited. In FIG. 4, the heating system 100 includes a forced-air furnace 400 that includes a fan 450 that draws air in and distributes air across one or more heat exchangers. For example, the second condenser 124 in fluid communication with the second refrigerant circuit 126 described herein can be positioned within the forced-air furnace 400. The second condenser 124 can provide heat to the air blown through the system. This heating system 100 can reduce the need to install hydronic piping inside the building. The second condenser 124 in communication with the second refrigerant circuit 126 can be a secondary heat exchanger that can be used alone or in addition to a primary heat exchanger 452 within the forced-air furnace 400.

Similar to the systems described above with reference to FIGS. 1-3, the heating system 100 shown in FIG. 4 can also include a first temperature sensor 402 to detect the temperature of the water in the water storage tank 114 and a second temperature sensor 404 to detect the temperature of air within the space to be heated. The first temperature sensor 402 can send an input signal to the controller 602 including data indicative of the temperature of the water. If the water temperature is below a predetermined threshold, the controller 602 can send an output signal to a multi-directional valve 202 to increase the refrigerant flow into the first refrigerant circuit 116. Additionally or alternatively, the second temperature sensor 404 can read the temperature of the space and can send an input signal to the controller 602 including data indicative of the temperature of the space. If the air temperature in the space is below a predetermined threshold, the controller 602 can send an output signal to the multi-directional valve 202 to increase the refrigerant flow into the second refrigerant circuit 126 (i.e., the forced-air furnace 400 in FIG. 3). Although the example heating system 100 shown in FIG. 4 includes a multi-directional valve 202 at the circuit split 204, the system can alternatively include two valves placed after the circuit split, i.e., the first valve 206 and the second valve 208 shown in FIG. 2. Alternatively, heating system 100 can include two EEVs, like in the system shown in FIG. 3.

Figure 5:
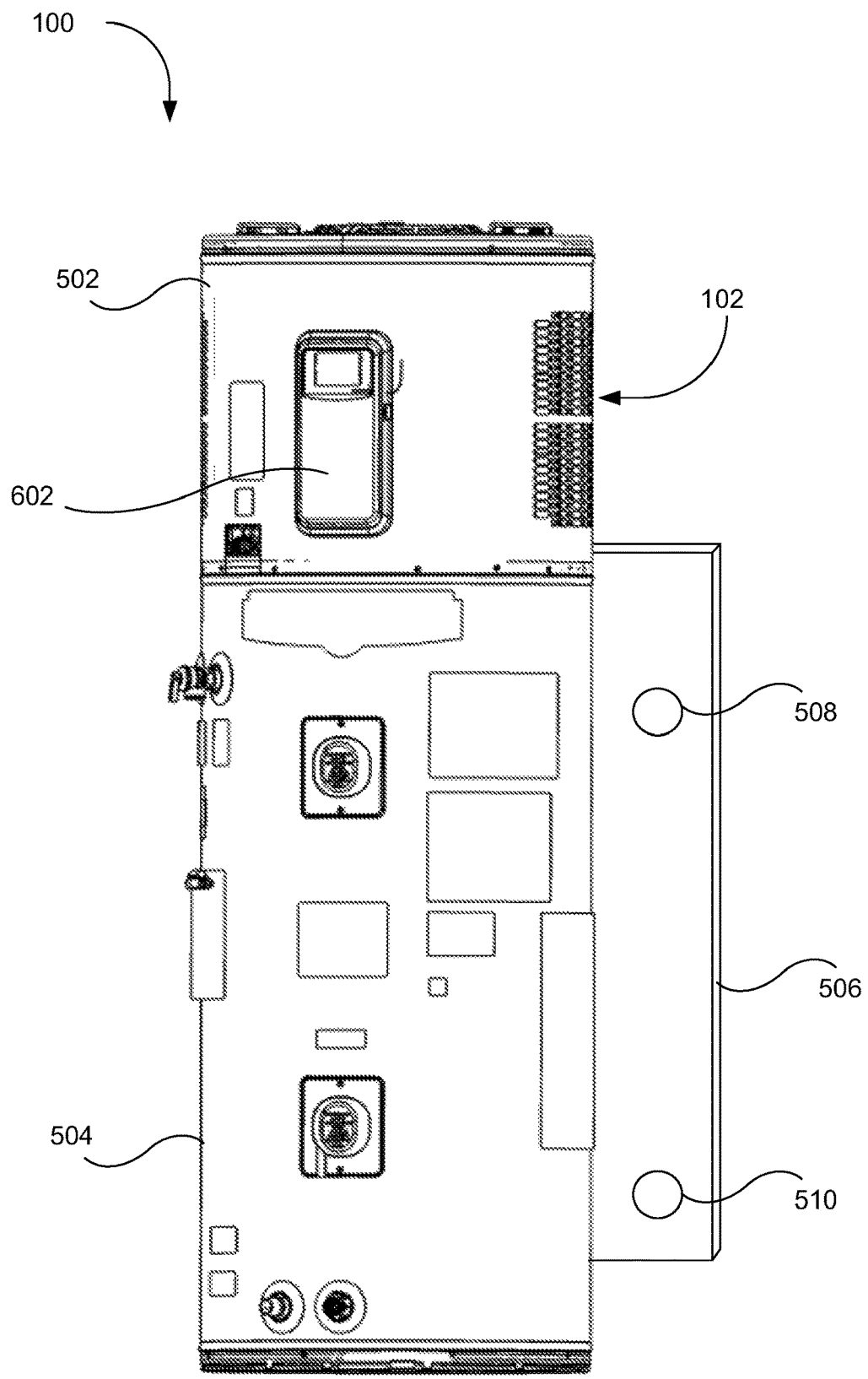
FIG. 5 is a front view of an example heating system placed within a single, integrated assembly, according to the present disclosure.

FIG. 5 is a front view of an example heating system 100 housed or at least partially housed within a single integrated assembly. As described throughout this disclosure, one aspect of the present disclosure is to provide a heating system that is easy to install, thereby obviating the need to install multiple components throughout the house or building and the need to have multiple technicians involved in the installation. One way to make the system more install-friendly is to combine many of the components within a single integrated assembly comprising multiple enclosures, or cabinets. The system 100 can include a heat source enclosure 502 that can house at least the evaporator 102, a fan for the evaporator, and the compressor 108. From the heat source enclosure 502, the refrigerant tubes that make up the first refrigerant circuit 116 and the second refrigerant circuit 126 can branch to separate enclosures or separate portions of an enclosure. The first refrigerant circuit 116 can branch and proceed into a tank enclosure 504 that encloses the water storage tank 114 and at least a portion of the first refrigerant circuit 116, for example the first condenser 122. The second refrigerant circuit 126 can branch and proceed into a hydronic enclosure 506 that encloses the second condenser 124 and at least a portion of the second refrigerant circuit 126. The hydronic enclosure 506 can also include the circulation pump 136 described above. The hydronic enclosure 506 can include a water inlet 508 and a water outlet 510 that correspond to different ends of the one or more radiant heating tubes 134 of the radiant heat circuit 132. The radiant heating tubes 134 can then proceed to the space to be heated in the building.

Figure 6:
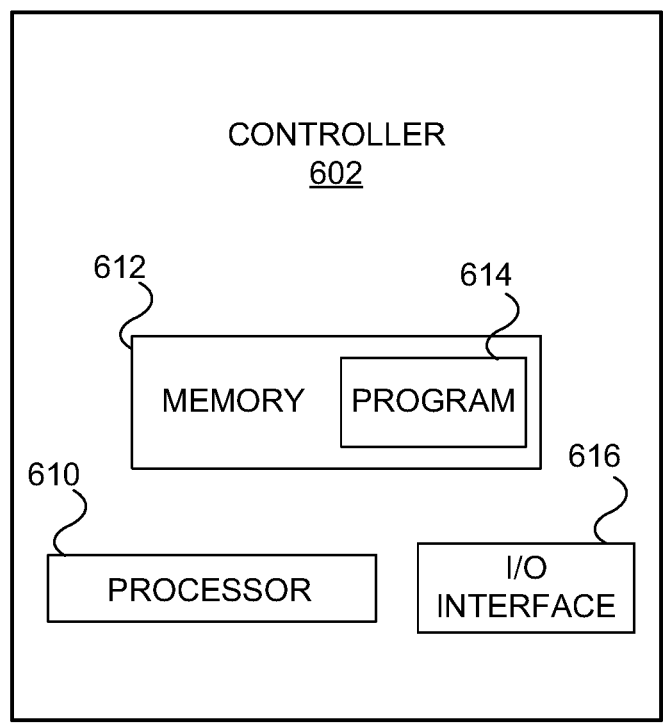
FIG. 6 is a component diagram of an example controller, according to the present disclosure.

FIG. 6 is a component diagram of an example controller 602. The controller 602 can include a processor 610. The processor 610 can receive signals (e.g., input signals from the temperature sensors 402 and 404) and determine whether the valves (e.g., multi-directional valve 202, first valve 206, second valve 208, first EEV 302, second EEV 304, etc.) should be adjusted to vary the refrigerant flow into the first refrigerant circuit 116 or the second refrigerant circuit 126. The processor 610 can include one or more of a microprocessor, microcontroller, digital signal processor, co-processor and/or the like or combinations thereof capable of executing stored instructions and operating upon data. The processor 610 can constitute a single core or multiple core processor that executes parallel processes simultaneously. For example, the processor 610 can be a single core processor that is configured with virtual processing technologies. The processor 610 can use logical processors to simultaneously execute and control multiple processes.

The controller 602 can include a memory 612. The memory 612 can be in communication with the one or more processors 610. The memory 612 can include instructions, for example a program 614 or other application, that causes the processor 610 and/or controller 602 to complete any of the processes described herein. For example, the memory 612 can include instructions that cause the controller 602 and/or processor 610 to receive input signals from the temperature sensors 402 and 404 indicative of the temperature of the water in the water storage tank 114 or air in the space to be heated. The controller 602 and/or processor 610 can determine if the water temperature and/or air temperature is below a predetermined threshold and is, therefore, in demand. The controller 602 and/or processor 610 can transmit output signals to the valves to adjust refrigerant flow, as described herein. The memory 612 can include, in some implementations, one or more suitable types of memory (e.g., volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs, executable instructions and data.

The controller 602 can be positioned proximate (e.g., attached to and/or within) the heating system 100. For example, in FIG. 5, the example heating system 100 includes a controller 602 attached to the heat source enclosure 502. The controller 602 can similarly be attached to the tank enclosure 504, the hydronic enclosure 506, and the like. Nothing requires the controller 602 to be positioned near the heating system 100, however. That is, the controller 602 can be located remotely with respect to the heating system 100. The controller 602 can, for example, be integrated into a thermostat or another device (e.g., a computing device, a mobile device, etc.) located somewhere else within the building, for example in the space to be heated. The controller 602 can communicate with the various components of the heating ventilation and air conditioning (HVAC) system with one or more input/output (I/O) devices 616. The I/O device 616 can include one or more interfaces for receiving signals or input from devices and providing signals or output to one or more devices that allow data to be received and/or transmitted by the controller 602. The I/O device 616 can facilitate wired or wireless connections with any of the components described herein, including the temperature sensors 402 and 404.

Figure 7:
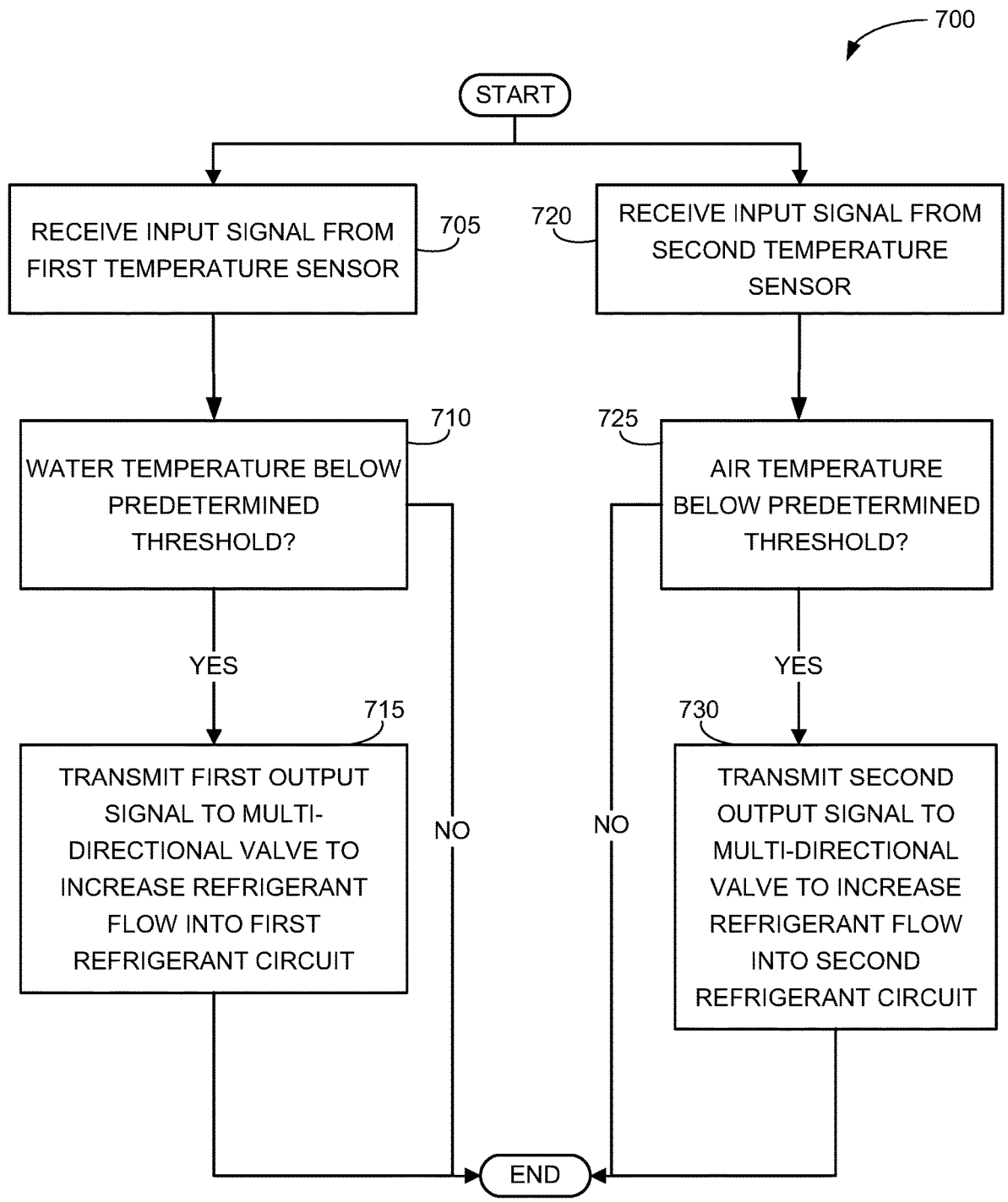
FIG. 7 is a flowchart showing an example process for a controller, according to the present disclosure.

FIG. 7 is a flowchart showing an example process 700 for a controller, for example controller 602, according to some examples of the present disclosure. The process 700 described in FIG. 7 includes a multi-directional valve, for example the multi-directional valve 202 described in FIG. 1, and, therefore, process 700 can be used to operate the heating system 100 shown in FIG. 1.

Process 700 can begin at step 705, where the controller receives an input signal from a temperature sensor (e.g., first temperature sensor 402 positioned proximate the water storage tank 114). At step 710, the controller can determine, via the data received from the temperature sensor, if the water temperature is below a predetermined threshold. To illustrate using an example, the predetermined threshold for the water in the storage tank can be 140° F. If the temperature from first temperature sensor reads the water temperature to be 110° F., the controller can identify that hot potable water is in demand. If the temperature is 140° F. or higher, then hot potable water can be determined not to be in demand.

If the temperature of the water is not less than the predetermined threshold, process 700 can take no further action with respect to the potable water circuit, but the controller can continue to receive data from the first temperature sensor. If the temperature of the water is less than the predetermined threshold, process 700 can proceed to step 715 which includes transmitting a first output signal to a multi-directional valve (e.g., multi-directional valve 202) to increase refrigerant flow into a first refrigerant circuit (e.g., first refrigerant circuit 116). This can provide needed heat, via high pressure, high temperature vaporized refrigerant, to the condenser (e.g., first condenser 122) to heat the water. Process 700 can end after step 715. In other systems, process 700 can also include steps related to a second circuit, for example a hydronic circuit or a forced-air furnace.

For systems with a hydronic circuit, process 700 can include step 720, where the controller receives an input signal from a temperature sensor (e.g., second temperature sensor 404 positioned in the space to be heated). At step 725, the controller can determine, via the data received from the temperature sensor, if the air temperature in the space is below a predetermined threshold. To illustrate using an example, the predetermined threshold for the air in the space can be 70° F. If the temperature from second temperature sensor reads the air temperature to be 67° F., the controller can identify that heat for the space is in demand. If the temperature is 70° F. or higher, then space heating can be determined not to be in demand.

If the air temperature is not less than the predetermined threshold, process 700 can take no further action with respect to the air temperature circuit, but the controller can continue to receive data from the second temperature sensor. If the air temperature is less than the predetermined threshold, process 700 can proceed to step 730 which includes transmitting a second output signal to the multi-directional valve to increase refrigerant flow into a second refrigerant circuit (e.g., second refrigerant circuit 126). This can provide needed heat, via high pressure, high temperature vaporized refrigerant, to a heat exchanger or condenser (e.g., second condenser 124) to heat the space via hydronic heating. Process 700 can end after step 730. Alternatively, other processes can be completed according to the systems and methods described herein. Also, as described above, the systems and methods described herein are able to simultaneously provide heated potable water and space heating, meaning steps 705-715 and steps 720-730 can be performed simultaneously.

Figure 8:
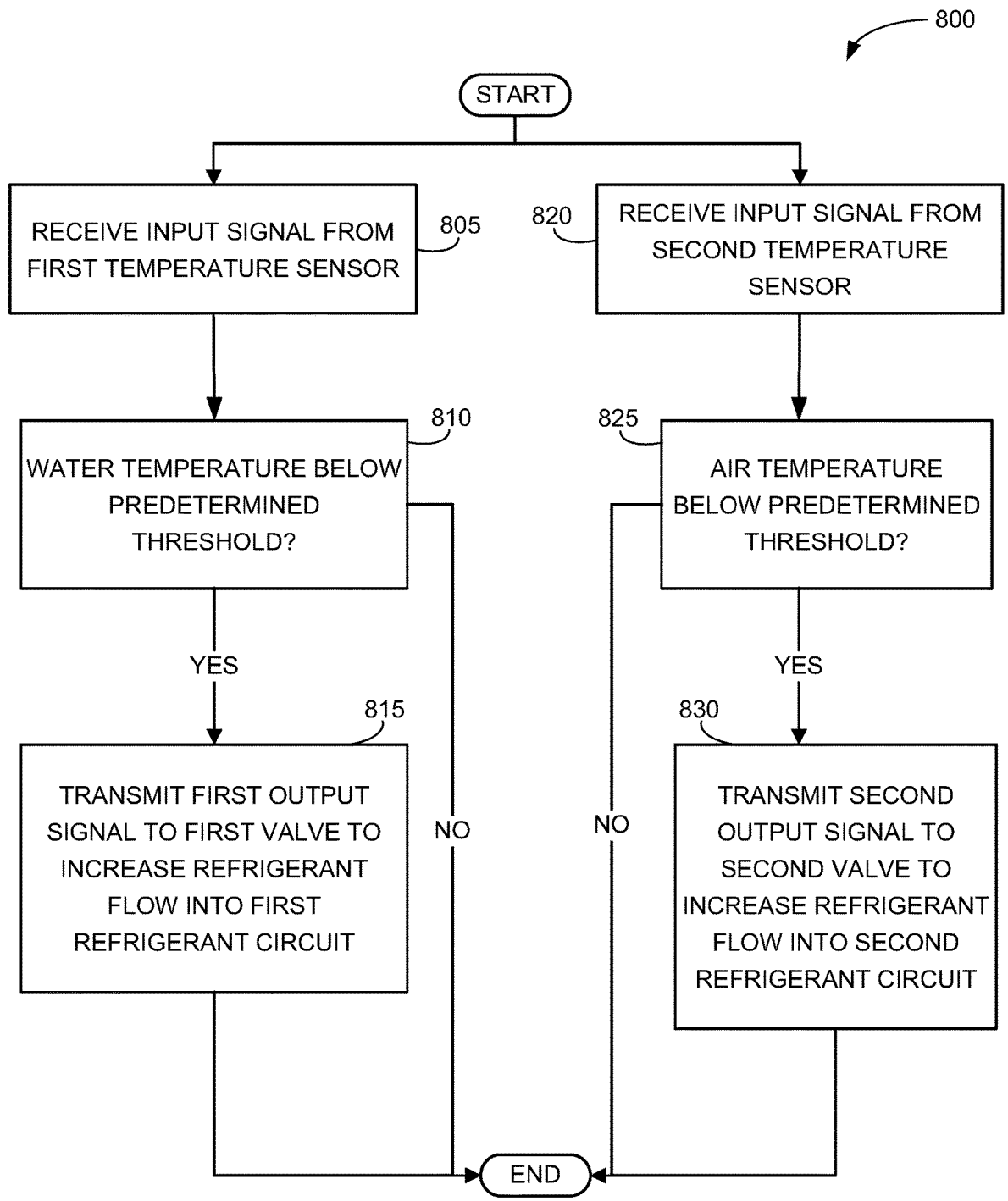
FIG. 8 is a flowchart showing an example process for a controller, according to the present disclosure.

FIG. 8 is a flowchart showing an example process 800 for a controller, for example controller 602, according to some examples of the present disclosure. The process 800 described in FIG. 8 includes a first valve (e.g., first valve 206) and a second valve (e.g., second valve 208), as described in FIG. 2, and, therefore, process 800 can be used to operate the heating system 100 shown in FIG. 2.

Process 800 can begin at step 805, where the controller receives an input signal from a temperature sensor (e.g., first temperature sensor 402 positioned proximate the water storage tank 114). At step 810, the controller can determine, via the data received from the temperature sensor, if the water temperature is below a predetermined threshold. If the temperature of the water is not less than the predetermined threshold, process 800 can take no further action with respect to the first circuit (i.e., the potable water circuit), but the controller can continue to receive data from the first temperature sensor. If the temperature of the water is less than the predetermined threshold, process 800 can proceed to step 815 which includes transmitting a first output signal to a first valve to increase refrigerant flow into a first refrigerant circuit (e.g., first refrigerant circuit 116). This can provide needed heat, via vaporized refrigerant, to the condenser (e.g., first condenser 122) to heat the water. Process 800 can end after step 815. In other systems, process 800 can also include steps related to a second circuit, for example a hydronic circuit or a forced-air furnace.

For systems with a hydronic circuit, process 800 can include step 820, where the controller receives an input signal from a temperature sensor (e.g., second temperature sensor 404 positioned in the space to be heated). At step 825, the controller can determine, via the data received from the temperature sensor, if the air temperature in the space is below a predetermined threshold. If the air temperature is not less than the predetermined threshold, process 800 can take no further action with respect to the second circuit (i.e., the space heating circuit), but the controller can continue to receive data from the second temperature sensor. If the air temperature is less than the predetermined threshold, process 800 can proceed to step 830 which includes transmitting a second output signal to a second valve to increase refrigerant flow into a second refrigerant circuit (e.g., second refrigerant circuit 126). This can provide needed heat, via high pressure, high temperature vaporized refrigerant, to a heat exchanger or condenser (e.g., second condenser 124) to heat the space via hydronic heating. Process 800 can end after step 830. Alternatively, other processes can be completed according to the systems and methods described herein.

Figure 9:
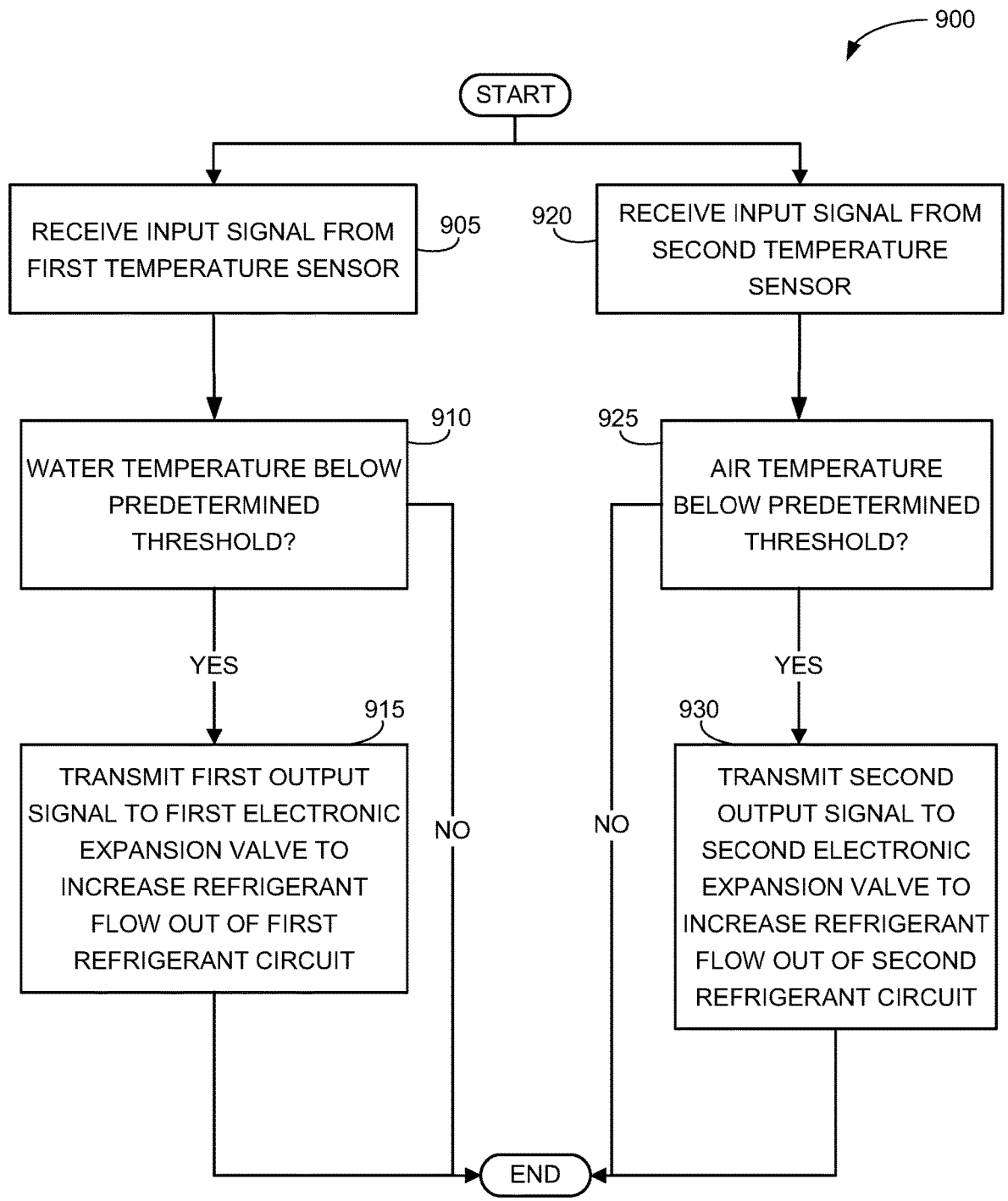
FIG. 9 is a flowchart showing an example process for a controller, according to the present disclosure.

FIG. 9 is a flowchart showing an example process 900 for a controller, for example controller 602, according to some examples of the present disclosure. The process 900 described in FIG. 9 includes a first EEV (e.g., first EEV 302) and a second EEV (e.g., second EEV 304), as described in FIG. 3, and, therefore, process 900 can be used to operate the heating system 100 shown in FIG. 3.

Process 900 can begin at step 905, where the controller receives an input signal from a temperature sensor (e.g., first temperature sensor 402 positioned proximate the water storage tank 114). At step 910, the controller can determine, via the data received from the temperature sensor, if the water temperature is below a predetermined threshold. If the temperature of the water is not less than the predetermined threshold, process 900 take no further action with respect to the first circuit (i.e., the potable water circuit), but the controller can continue to receive data from the first temperature sensor. If the temperature of the water is less than the predetermined threshold, process 900 can proceed to step 915 which includes transmitting a first output signal to a first EEV to increase refrigerant flow out of a first refrigerant circuit (e.g., first refrigerant circuit 116). This increase in the refrigerant flow can include opening the first EEV so that refrigerant can flow freely though the first refrigerant circuit. This can provide needed heat, via high pressure, high temperature vaporized refrigerant, to the condenser (e.g., first condenser 122) to heat the water. Process 900 can end after step 915. In other systems, process 900 can also include steps related to a second circuit, for example a hydronic circuit or a forced-air furnace.

For systems with a hydronic circuit, process 900 can include step 920, where the controller receives an input signal from a temperature sensor (e.g., second temperature sensor 404 positioned in the space to be heated). At step 925, the controller can determine, via the data received from the temperature sensor, if the air temperature in the space is below a predetermined threshold. If the air temperature is not less than the predetermined threshold, process 900 can take no further action with respect to the second circuit (i.e., the space heating circuit), but the controller can continue to receive data from the second temperature sensor. If the air temperature is less than the predetermined threshold, process 900 can proceed to step 930 which includes transmitting a second output signal to a second EEV to increase refrigerant flow out of a second refrigerant circuit (e.g., second refrigerant circuit 126). This increase in the refrigerant flow can include opening the second EEV so that refrigerant can flow freely though the second refrigerant circuit. This can provide needed heat, via high pressure, high temperature vaporized refrigerant, to a condenser (e.g., second condenser 124) to heat the space via hydronic heating. Process 900 can end after step 930. Alternatively, other processes can be completed according to the systems and methods described herein.

Certain examples and implementations of the disclosed technology are described above with reference to block and flow diagrams according to examples of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams do not necessarily need to be performed in the order presented, can be repeated, or do not necessarily need to be performed at all, according to some examples or implementations of the disclosed technology. It is also to be understood that the mention of one or more method steps does not preclude the presence of additional method steps or intervening method steps between those steps expressly identified. Additionally, method steps from one process flow diagram or block diagram can be combined with method steps from another process diagram or block diagram. These combinations and/or modifications are contemplated herein.

It should also be noted that, as used in the specification and the appended claims, the singular forms "a," "an," and "the" include plural references unless the context clearly dictates otherwise. References to a composition containing "a" constituent is intended to include other constituents in addition to the one named.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

While the present disclosure has been described in connection with a plurality of exemplary aspects, as illustrated in the various figures and discussed above, it is understood that other similar aspects can be used, or modifications and additions can be made, to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

The components described hereinafter as making up various elements of the disclosure are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter. Additionally, the components described herein may apply to any other component within the disclosure. Merely discussing a feature or component in relation to one embodiment does not preclude the feature or component from being used or associated with another embodiment.

What is claimed is:

1. A heating system comprising:
   an evaporator having an evaporator inlet and an evaporator outlet;
   a compressor having a compressor inlet in fluid communication with the evaporator outlet and a compressor outlet;
   a water storage tank;
   a first condenser proximate the water storage tank;
   a first refrigerant circuit in fluid communication with the compressor outlet at a first end of the first refrigerant circuit and in fluid communication with the evaporator inlet at a second end of the first refrigerant circuit, the first refrigerant circuit configured to provide heat to heat the first condenser;
   a second condenser for heating a fluid to provide a space heating effect;
   a second refrigerant circuit in fluid communication with the compressor outlet at a first end of the second refrigerant circuit and in fluid communication with the evaporator inlet at a second end of the second refrigerant circuit, the second refrigerant circuit configured to provide heat to the second condenser;
   a first enclosure containing the water storage tank, the first condenser, and at least a portion of the first refrigerant circuit;
   a second enclosure containing the second condenser and at least a portion of the second refrigerant circuit in addition to the second condenser, wherein the second enclosure is disposed adjacent to and directly attached to the first enclosure; and
   a single third enclosure containing the evaporator and the compressor, wherein the single third enclosure is disposed adjacent to and directly attached to the first enclosure.

2. The heating system of claim 1, wherein the compressor outlet comprises a circuit split, a first end of the circuit split in fluid communication with the first end of the first refrigerant circuit, and a second end of the circuit split in fluid communication with the first end of the second refrigerant circuit.

3. The heating system of claim 2, wherein the circuit split comprises a multi-directional valve configured to independently vary refrigerant flow to the first refrigerant circuit and the second refrigerant circuit.

4. The heating system of claim 3, further comprising an expansion valve disposed proximate the evaporator inlet, wherein the second end of the first refrigerant circuit and the second end of the second refrigerant circuit merge into a single conduit in fluid communication with the expansion valve.

5. The heating system of claim 2, further comprising:
   a first valve disposed along the first refrigerant circuit between the circuit split and the water storage tank, the first valve configured to vary refrigerant flow into the first refrigerant circuit; and a second valve disposed along the second refrigerant circuit between the circuit split and the second condenser, the second valve configured to vary refrigerant flow into the second refrigerant circuit.

6. The heating system of claim 5, further comprising an expansion valve disposed proximate the evaporator inlet,
wherein the second end of the first refrigerant circuit and the second end of the second refrigerant circuit merge into a single conduit in fluid communication with the expansion valve.

7. The heating system of claim 1, further comprising:
a first electronic expansion valve disposed along the first refrigerant circuit between the water storage tank and the evaporator inlet, the first electronic expansion valve configured to vary refrigerant flow out of the first refrigerant circuit and into the evaporator; and
a second electronic expansion valve disposed along the second refrigerant circuit between the second condenser and the evaporator inlet, the second electronic expansion valve configured to vary refrigerant flow out of the second refrigerant circuit and into the evaporator.

8. The heating system of claim 1, further comprising a fan configured to blow air across the second condenser,
wherein the second condenser is configured to heat the air.

9. The heating system of claim 1, further comprising a radiant heating tube and a circulation pump, wherein the second condenser is configured to heat the radiant heating tube.

10. The heating system of claim 9, wherein the second condenser is a brazed plate heat exchanger.

11. The heating system of claim 1, wherein the single third enclosure is disposed above the first enclosure, and wherein the second enclosure is disposed beside the first enclosure.

12. A heating system comprising:
an evaporator;
a compressor;
a first condenser;
a water storage tank;
a first temperature sensor configured to detect a water temperature of water within the water storage tank;
a first refrigerant circuit configured to heat the water storage tank via the first condenser;
a second condenser;
a fan configured to blow air across the second condenser, wherein the second condenser is configured to heat the air;
a second temperature sensor configured to detect air temperature within a space;
a second refrigerant circuit configured to provide heat to the second condenser;
a first enclosure containing the water storage tank, the first condenser, and at least a portion of the first refrigerant circuit;
a second enclosure containing the second condenser, the fan, and at least a portion of the second refrigerant circuit, wherein the second enclosure is disposed adjacent to the first enclosure;
a single third enclosure containing all heat sources for the water storage tank and the air, the heat sources comprising the evaporator and the compressor, wherein the single third enclosure is disposed adjacent to and directly attached to the first enclosure;
a controller having a processor and memory storing instructions that, when executed by the processor, cause the controller to:
receive a first input signal from the first temperature sensor;
transmit a first output signal to adjust refrigerant flow into the first refrigerant circuit based on the first input signal;
receive a second input signal from the second temperature sensor; and
transmit a second output signal to adjust refrigerant flow into the second refrigerant circuit based on the second input signal.

13. The heating system of claim 12, wherein:
the first input signal is indicative of the water temperature being below a first predetermined threshold;
the first output signal includes instructions to increase the refrigerant flow into the first refrigerant circuit;
the second input signal is indicative of the air temperature being below a second predetermined threshold; and
the second output signal includes instructions to increase the refrigerant flow into the second refrigerant circuit.

14. The heating system of claim 12, further comprising a multi-directional valve configured to independently vary refrigerant flow to the first refrigerant circuit and the second refrigerant circuit,
wherein the first output signal and the second output signal includes instructions to adjust the multi-directional valve.

15. The heating system of claim 12, further comprising:
a first valve disposed along the first refrigerant circuit; and
a second valve disposed along the second refrigerant circuit,
wherein the first output signal includes instructions to adjust the first valve responsive to the first input signal, and
wherein the second output signal includes instructions to adjust the second valve responsive to the second input signal.

16. The heating system of claim 12, further comprising:
a first electronic expansion valve disposed along the first refrigerant circuit and configured to vary refrigerant flow out of the first refrigerant circuit and into an evaporator; and
a second electronic expansion valve disposed along the second refrigerant circuit and configured to vary refrigerant flow out of the second refrigerant circuit and into the evaporator,
wherein the first output signal includes instructions to adjust the first electronic expansion valve responsive to the first input signal, and
wherein the second output signal includes instructions to adjust the second electronic expansion valve responsive to the second input signal.

17. The heating system of claim 12, further comprising a primary heat exchanger contained within the second enclosure and disposed between the fan and the second condenser, wherein the fan is further configured to blow air across the primary heat exchanger, and
wherein the primary heat exchanger is configured to heat the air.

18. The heating system of claim 12, further comprising a radiant heating tube and a circulation pump, wherein the second condenser is configured to heat the radiant heating tube.

19. The heating system of claim 12, wherein the compressor is in fluid communication with the evaporator, the first refrigerant circuit, and the second refrigerant circuit.

20. A heating system comprising:

an evaporator having an evaporator inlet and an evaporator outlet;

a compressor having a compressor inlet in fluid communication with the evaporator outlet and a compressor outlet;

a water storage tank;

a first refrigerant circuit in fluid communication with the compressor outlet at a first end and the evaporator inlet at a second end, the first refrigerant circuit configured to heat the water storage tank;

a radiant heating tube comprising non-potable water;

a circulation pump configured to circulate the non-potable water through the radiant heating tube;

a second condenser configured to heat the non-potable water;

a second refrigerant circuit in fluid communication with the compressor outlet at a first end and the evaporator inlet at a second end, the second refrigerant circuit configured to heat the second condenser;

a first enclosure containing the water storage tank and at least a portion of the first refrigerant circuit;

a second enclosure containing the second condenser and at least a portion of the second refrigerant circuit in addition to the second condenser, wherein the second enclosure is disposed adjacent to and directly attached to the first enclosure;

a single third enclosure containing the evaporator and the compressor, wherein the single third enclosure is disposed adjacent to and directly attached to the first enclosure;

one or more valves configured to adjust refrigerant flow within the first refrigerant circuit and the second refrigerant circuit; and a controller configured to output one or more control signals to the one or more valves.

\* \* \* \* \*